M. JOHNSON,
Assignor, by mesne assignments, to C. La Dow.
Rotary-Cultivator.
No. 9,168. Reissued April 20, 1880.
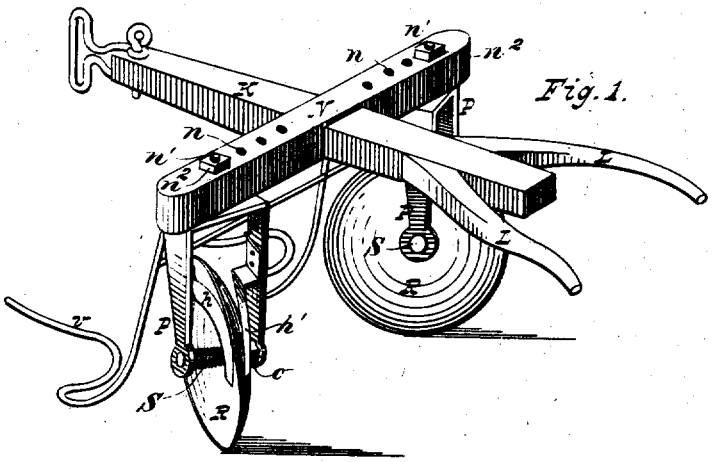
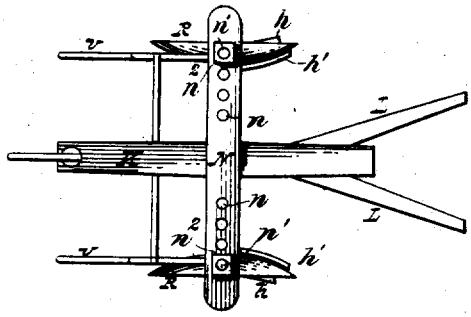
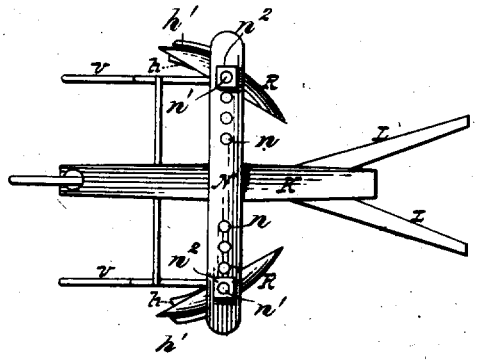
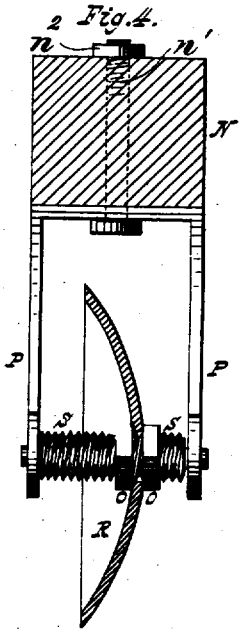
WITNESSES:
Wm A. Skinkle
Geo W. Breck
Charles La Dow ASSIGNEE OF
Moses Johnson INVENTOR,
By his Attorneys
Baldwin Hopkins & Peyton

UNITED STATES PATENT OFFICE.

MOSES JOHNSON, OF LOCKPORT, NEW YORK, ASSIGNOR, BY MESNE ASSIGNMENTS, TO CHARLES LA DOW.

ROTARY CULTIVATOR.

SPECIFICATION forming part of Reissued Letters Patent No. 9,168, dated April 20, 1880.

Original No. 93,307, dated August 3, 1869; Reissue No. 8,222, dated May 7, 1878. Application for reissue filed November 11, 1879.

DIVISION A.

*To all whom it may concern:*

Be it known that I, MOSES JOHNSON, formerly of Three Rivers, in the county of St. Joseph and State of Michigan, but now residing at Lockport, in the county of Niagara and State of New York, have invented certain new and useful Improvements in Rotary Cultivators, of which I hereby declare the following to be a full, clear, and exact description, reference being had to the accompanying drawings, making part of this specification, and in which—

Figure 1 represents a view in perspective of a machine embracing all the improvements herein claimed, the disks being shown as inclined outwardly from front to rear. Fig. 2 represents a plan or top view of the machine, with the disks arranged parallel to the line of draft; Fig. 3, a similar view with the disks inclined inwardly from front to rear. Fig. 4 represents a vertical central section through one of the disks, on an enlarged scale, showing the means of locking the disk on its axle and of adjusting it endwise thereon.

My invention relates to that class of cultivators which employ rotary disks for cutting the earth. Letters Patent No. 85,451, granted to me December 29, 1868, show a rotary cultivator in which concavo-convex disks adjustable at an angle relatively to the line of draft are mounted upon gang-beams also adjustable relatively to the line of draft. Said patent also shows a series of disks adjustable relatively to the line of draft upon a single transverse beam connected directly with the tongue. My present invention is based on and constitutes an improvement upon the machine shown in my aforesaid Letters Patent.

The object of the first part of my invention is to enable the attendant to guide or control the machine, which end I attain by combining a draft-bar, a cross-beam connected therewith, cutting-disks secured upon the cross-beam and supporting the same above the ground, and handles by which the implement may be controlled.

My invention further consists in combining a main frame, a draft-bar, cutting-disks arranged on opposite sides of the draft-bar and supporting the frame, and handles to vary the angle of the disks.

The object of the next part of my invention is to adjust the lateral distance between the disks, which end I attain by combining the supporting stirrups or yokes of the disks with laterally-movable adjusting-clamps, which permit of the lateral adjustment of the disks upon the frame or gang-bar.

The next part of my invention relates to the method of clearing the disks from clogging matter. Prior to the date of my invention scrapers had been used in connection with revolving clod-crushers, land-rollers, and seeding-machines; but the organization and operation of such devices differ from those herein of my invention.

My improvements under this head consist, first, in combining a rotating concavo-convex cutting-disk with a pendent scraper, which enters and cleans the concavity of said disk; second, in combining a revolving concavo-convex disk, a down-hanging stirrup for said disk, and a pendent scraper attached to said support and conforming to the concavity of the disk; third, in combining a scraper, a stirrup, a revolving concavo-convex cutting-disk carried by an axle on said stirrup, and mechanism for varying the relation between the disk and scraper; fourth, in combining a down-hanging support, a concavo-convex cutting-disk revolving in bearings thereon, and a pendent scraper provided with a cutting-edge in rear, to shave clogging matter from the disks; fifth, in combining a down-hanging support, an axle mounted thereon, a concavo-convex cutting-disk movable laterally on the axle, and clamping-nuts working on screw-threads on each side of the disk to lock it in its adjusted position; sixth, in combining a draft-bar, a cross-bar, a cutting-disk, a support therefor, a scraper supported by one end only, and mechanism whereby the disk and scraper may be simultaneously adjusted relatively to the line of draft.

The accompanying drawings represent a rotary cultivator, consisting of a beam or draft-bar, K, to which are rigidly secured a cross-bar, N, and handles or levers L L. A series of holes or vertical apertures, *n*, pierced through the cross-beam at equal distances from the tongue, on each side thereof, receive the screw-threaded shanks *n'* of down-hanging standards, yokes, or stirrups P.

The screw-shanks are clamped upon the beam by means of nuts $n^2$, which can readily be loosened or detached to permit the stirrups to be adjusted nearer to or farther from the draft-bar, or to vary their angle to the line of draft, or to reverse the disks on the beam and yet to hold them firmly in position, in a way well understood.

Each standard constitutes a support or bearing for the journals of a screw-threaded axle, S, (shown in detail in Fig. 4,) on which axle a concavo-convex cutting-disk, R, is clamped by means of clamp-nuts *o*, one on each side thereof, which method of attachment allows the disks readily to be adjusted on their axle and to be removed or replaced, but holds them securely while in operation.

Revolving cutting devices or disks are arranged, according to the construction above described, at each end of the cross-bar. Their distances apart may be regulated by means of the apertures *n*, above described. They may also be adjusted pivotally by loosening the clamping-nuts $n^2$, turning the shanks *n'* to the required position, and then clamping them again, whereby said disks may be arranged to throw the earth either inwardly or outwardly, or to cut straight forward. These respective arrangements are shown in Figs. 1, 2, and 3, the concave side of the disk being, preferably, the working face. There is also attached to each standard or support P a scraping-blade or clearer, *h*, which enters the concavity of the disks, and removes the soil accumulated thereon by its rotation. Another scraper, *h'*, in like manner mounted upon the bifurcated standard or support, performs the same offices on the convex side of the disk. Both scrapers preferably conform to the curvature of the disks. One of them, obviously, may be used without the other.

The scrapers *h h'*, it will be observed, are pendent, or extend downwardly from their point of attachment to their supports, and are supported by one end only, so that clogging matter scraped from the disks will readily drop from the scrapers.

The scrapers are made with sharp cutting-edges at the back. These cutting-edges serve to shave the earth from the disks, and thus more effectually clear them.

The concavo-convex form of disk is found to do its work far more effectually than the old flat disk; but the scrapers as ordinarily arranged are not adapted to be used with the concavo-convex form of disks. Such adaptation, therefore, forms an important part of my invention and accomplishes a desirable and important result—viz., that of scraping out the hollow side of the disks, which side is most liable to clog.

The attachment of the scrapers to the disk-supports enables the distance between the disks and scrapers to be varied, and yet insures the proper relation between them when the disks are adjusted relatively to the line of draft.

Guards or scrapers *v'*, consisting of strong wires or small steel bars, bent into the shape shown in Fig. 1, are inserted in the cross-bar, and project in front of the disks, being made sufficiently strong to serve in pulling up and removing weeds or ordinary obstructions, but not too rigid to serve as springs.

The nuts on the threaded axles permit the disks to be adjusted laterally on their axles, and yet clamp them tightly thereon, to compensate for any inequality of wear or defective construction.

The operation of the machine will readily be understood from the foregoing description.

In another division of this application I have shown and claimed mechanism by which a leverage could be obtained to vary and hold the angle of the cutters relatively to the line of draft. I do not claim herein any subject-matter specified in that application.

Having thus described my improvements in rotary cultivators, what I claim as of my own invention is—

1. The combination, substantially as herein-before set forth, of a draft-bar, a cross-beam connected therewith, cutting-disks secured upon the cross-beam and supporting the same above the ground, and handles by which the implement may be controlled.

2. The combination, substantially as herein-before set forth, of a main frame, a draft-bar, cutting-disks arranged on opposite sides thereof and supporting the frame, and handles to vary the angle of the disks.

3. The combination, substantially as herein-before set forth, of a cross-beam or frame, supporting stirrups or yokes in which the disks are mounted, and laterally-movable adjusting-clamps, which permit the lateral adjustment of the disks upon the frame or cross-beam.

4. The combination, substantially as herein-before set forth, of a rotating concavo-convex cutting-disk with a pendent scraper adapted to enter and clean the concavity of said disk.

5. The combination, substantially as herein-before set forth, of a revolving concavo-convex disk, a support in which it is mounted, and a pendent scraper attached to said support and conforming to the concavity of the disk.

6. The combination, substantially as herein-before set forth, of a revolving cutting-disk mounted on a down-hanging support, a scraper for the disk, and adjusting mechanism, whereby the distance between the disk and the scraper can be varied.

7. The combination, substantially as herein-before set forth, of a draft-frame, a down-hanging support, a concavo-convex cutting-disk revolving in bearings therein, and a pendent scraper provided with a cutting-edge in the rear to shave clogging matter from the disk.

8. The combination, substantially as hereinbefore set forth, of a draft-frame, down-hanging support, and axle mounted thereon, a concavo-convex cutting-disk movable laterally on the axle, and clamping-nuts working on screw-threads on each side of the disk to lock it in its adjusted position.

9. The combination, substantially as hereinbefore set forth, of a draft-bar, a cross-bar, a cutting-disk, a support therefor, a scraper supported by one end only, and mechanism whereby the disk and scraper may be simultaneously adjusted relatively to the line of draft.

In testimony that I claim the foregoing as my own I affix my signature in presence of two witnesses.

MOSES JOHNSON. [L. S.]

Witnesses:
C. M. SOUTHWORTH,
ALFRED H. ROWELL.